(12) United States Patent
Kochi et al.

(10) Patent No.: US 11,034,226 B2
(45) Date of Patent: Jun. 15, 2021

(54) VEHICLE

(71) Applicant: HONDA MOTOR CO., LTD., Tokyo (JP)

(72) Inventors: Naoto Kochi, Saitama (JP); Tetsuhisa Sakamoto, Saitama (JP); Ryosaku Izawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 7 days.

(21) Appl. No.: 16/750,699

(22) Filed: Jan. 23, 2020

(65) Prior Publication Data
US 2020/0247225 A1 Aug. 6, 2020

(30) Foreign Application Priority Data
Feb. 1, 2019 (JP) .............................. JP2019-017411

(51) Int. Cl.
*B60K 1/04* (2019.01)
*B60K 1/00* (2006.01)
(Continued)

(52) U.S. Cl.
CPC .................. *B60K 1/00* (2013.01); *B60K 1/04* (2013.01); *B60K 11/02* (2013.01); *B60K 11/04* (2013.01); *B60L 50/64* (2019.02); *B60L 50/66* (2019.02); *B60K 2001/006* (2013.01); *B60K 2001/0438* (2013.01)

(58) Field of Classification Search
CPC ............................... B60K 11/02; B60K 11/04
See application file for complete search history.

(56) References Cited

U.S. PATENT DOCUMENTS

2004/0108148 A1* 6/2004 Vanderwees ............ B60L 1/003
180/65.1
2014/0232184 A1* 8/2014 Ukai ................... B60R 16/0215
307/10.1
(Continued)

FOREIGN PATENT DOCUMENTS

JP 2002-144888 A 5/2002
JP 2005-085668 A 3/2005
(Continued)

OTHER PUBLICATIONS

Nov. 17, 2020, Japanese Office Action issued for related JP Application No. 2019-017411.

*Primary Examiner* — John D Walters
*Assistant Examiner* — James J Triggs
(74) *Attorney, Agent, or Firm* — Paratus Law Group, PLLC (57) ABSTRACT

A vehicle includes a vehicle interior; a front room provided in front of the vehicle interior; an electric motor control device provided at a rear side of the vehicle interior and below a floor panel; a battery provided below the vehicle interior and below the floor panel; a cooling device provided in the front room; a first cooling pipe configured to supply a refrigerant from the cooling device to the electric motor control device; and a second cooling pipe configured to discharge the refrigerant from the electric motor control device to the cooling device. The floor panel has a recessed portion recessed upwards, and the first cooling pipe and the second cooling pipe are accommodated in the recessed portion.

10 Claims, 10 Drawing Sheets

(51) Int. Cl.
  *B60L 50/60* (2019.01)
  *B60K 11/04* (2006.01)
  *B60L 50/64* (2019.01)
  *B60K 11/02* (2006.01)

(56) References Cited

U.S. PATENT DOCUMENTS

2017/0246943 A1* 8/2017 Salz-Breuer ............ B60L 50/66
2018/0086224 A1* 3/2018 King ................... H01M 10/613

FOREIGN PATENT DOCUMENTS

| JP | 2011-230530 A | 11/2011 |
| JP | 2013-150433 A | 8/2013 |
| JP | 2018-096280 A | 6/2018 |
| WO | WO 2013/073661 A1 | 5/2013 |

* cited by examiner

VEHICLE

CROSS-REFERENCE TO RELATED APPLICATIONS

This application is based on and claims priority under 35 USC 119 from Japanese Patent Application No. 2019-017411 filed on Feb. 1, 2019.

TECHNICAL FIELD

The present invention relates to a vehicle including an electric motor control device and a cooling device that cools the electric motor control device.

BACKGROUND ART

In the vehicle disclosed in JP-A-2018-96280, an electric motor control device (PCU) and a cooling device that cools the electric motor control device (radiator) are arranged in a front room provided in front of a vehicle interior.

In a rear-wheel drive vehicle, an electric motor and an electric motor control device are arranged at a rear part of the vehicle, while a battery is arranged below a floor panel at the center of the vehicle and a cooling device may be arranged in a front room. In this case, a cooling pipe connecting the cooling device and the motor control device needs to be arranged from a front part of the vehicle to the rear part of the vehicle, but if the cooling pipe is arranged on the side to avoid the battery, the cooling pipe may be damaged due to foreign matters or impact from the outside. Further, if the cooling pipe is arranged between the battery and the floor panel, there is a risk that an installation height of the battery is lowered due to the influence of the cooling pipe, and the distance between the ground and the battery may be reduced.

SUMMARY

An aspect of the present invention provides a vehicle in which an installation height of a battery is prevented from being lowered due to the influence of a cooling pipe, and the distance between the ground and the battery can be reduced.

An embodiment of the invention relates to a vehicle that includes:
  a vehicle interior;
  a front room provided in front of the vehicle interior;
  an electric motor control device provided at a rear side of the vehicle interior and below a floor panel;
  a battery provided below the vehicle interior and below the floor panel;
  a cooling device provided in the front room;
  a first cooling pipe configured to supply a refrigerant from the cooling device to the electric motor control device; and
  a second cooling pipe configured to discharge the refrigerant from the electric motor control device to the cooling device,
  wherein the floor panel has a recessed portion recessed upwards, and
  wherein the first cooling pipe and the second cooling pipe are accommodated in the recessed portion.

According to the above embodiment of the present invention, a first cooling pipe and a second cooling pipe that connect a cooling device provided in a front room and an electric motor control device provided in a rear side of a vehicle interior are accommodated in a recessed portion of a floor panel, so that the distance between a battery and the floor panel can be reduced, and the distance between the ground and the battery can be ensured.

DESCRIPTION OF EMBODIMENTS

A vehicle according to each embodiment of the present invention will be described below with reference to drawings. The drawings should be seen based on a direction of reference numerals. In the following description, front, rear, left, right, upper, and lower directions are described according a view from an operator. In the drawings, a front side of the vehicle is denoted by Fr, a rear side is denoted by Rr, a left side is denoted by L, a right side is denoted by R, an upper side is denoted by U, and a lower side is denoted by D.

First Embodiment

[Overall Structure of Vehicle]

Figure 1:
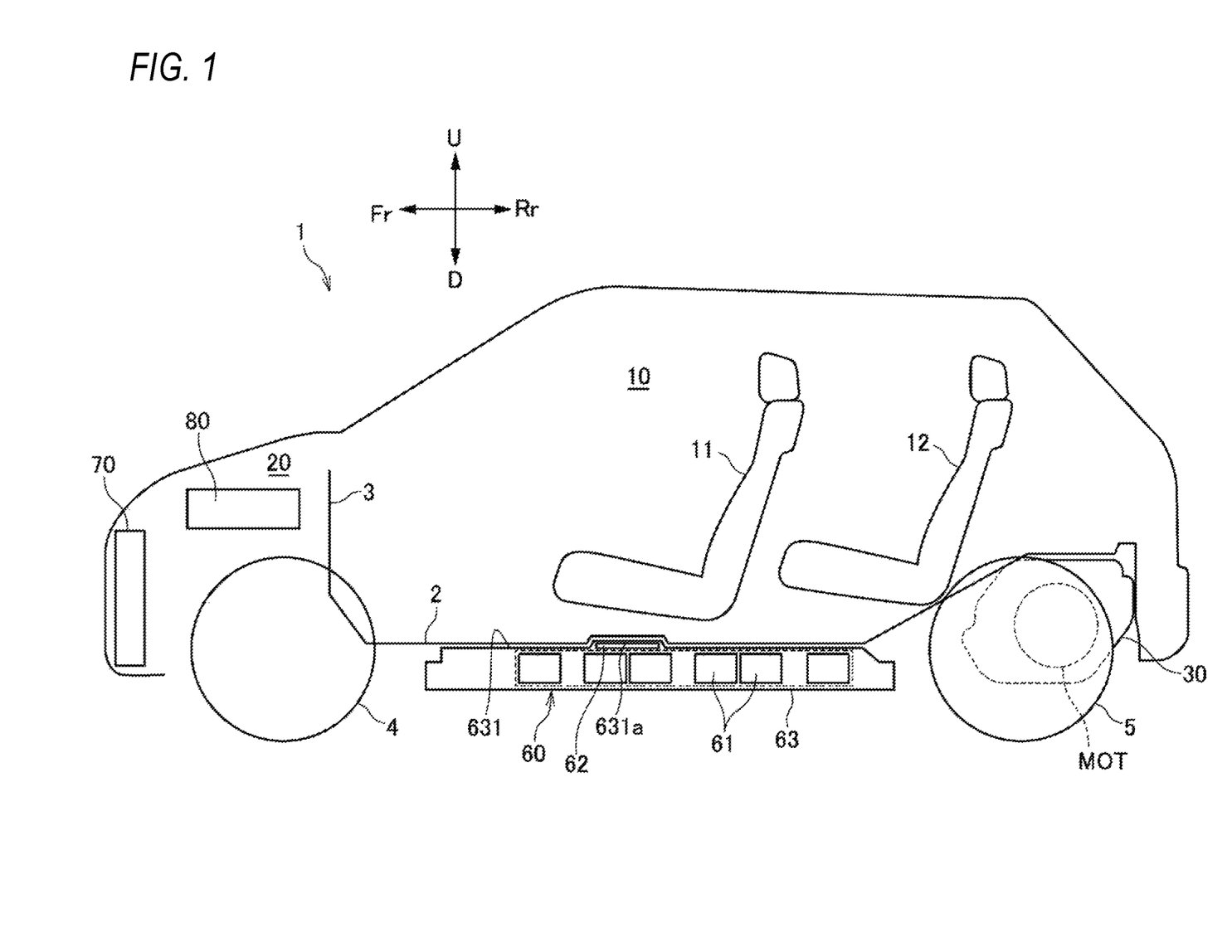
FIG. 1 is a schematic side view showing an overall structure of a vehicle according to a first embodiment of the present invention.
Figure 2:
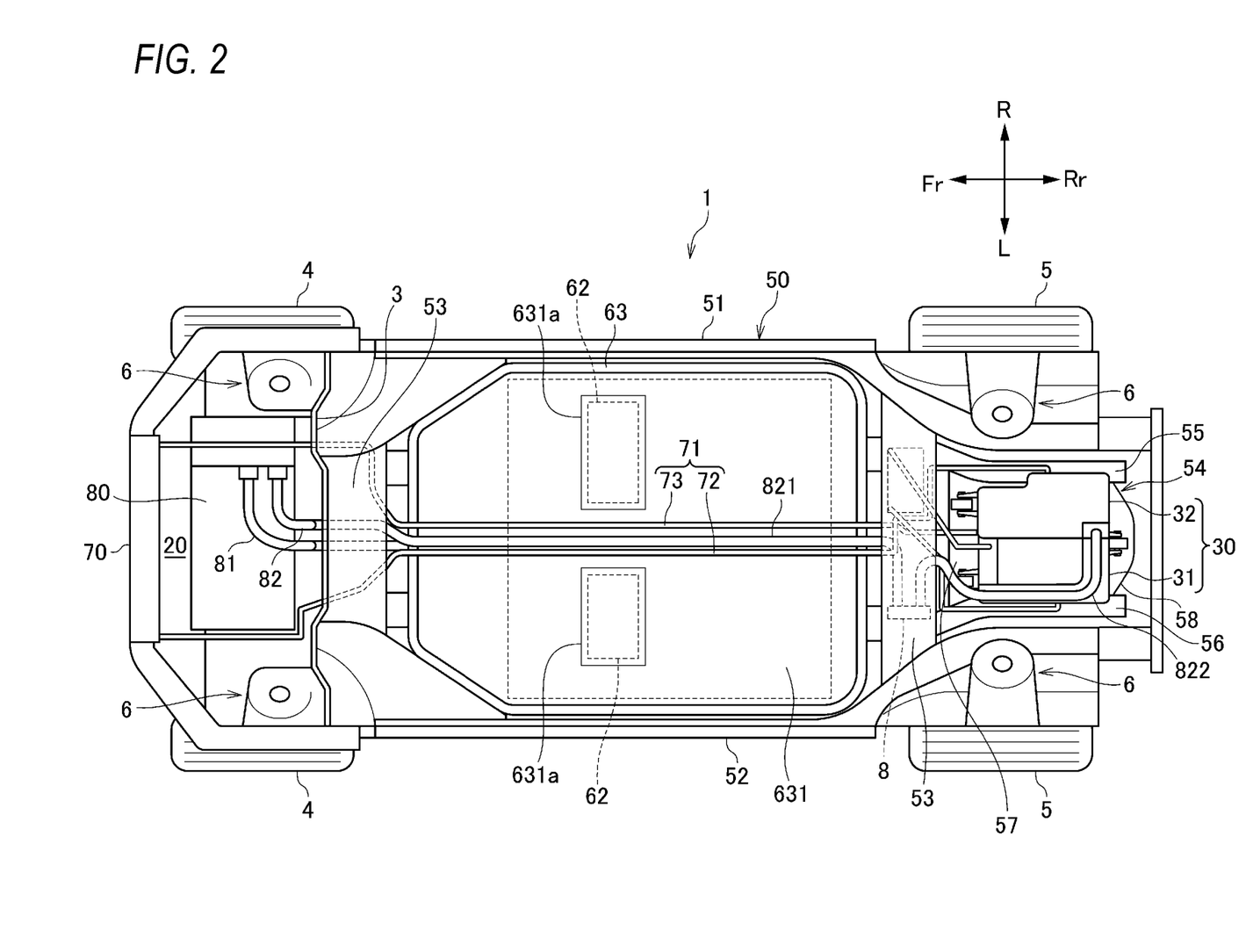
FIG. 2 is a plan view showing an underfloor structure of the vehicle in FIG. 1.

As shown in FIGS. 1 and 2, a vehicle 1 according to a first embodiment of the present invention is formed by a vehicle interior 10 and a front room 20 in front of the vehicle interior 10, which are defined by a floor panel 2 and a dash panel 3. Front seats 11 and rear seats 12 are provided in the vehicle interior 10. A driving device unit 30 is provided below the floor panel 2 in rear of the rear seats 12. The driving device unit 30 drives left and right rear wheels 5. That is, in the vehicle 1, the left and right rear wheels 5 are driving wheels, and left and right front wheels 4 are driven wheels. The front wheels 4 and the rear wheels 5 are supported by a vehicle body frame 50 via suspensions (not shown) supported by respective suspension support portions 6.

[Vehicle Body Frame]

A vehicle body frame 50 includes a pair of left and right side members 51, 52 extending in a front-rear direction, a plurality of cross members 53 extending in a left-right direction and connecting the side members 51, 52, and a sub-frame 54 having a rectangular shape so as to surround the driving device unit 30. The sub-frame 54 includes a pair of sub-side members 55, 56 supported by the pair of side members 51, 52, and a front frame member 57 and a rear frame member 58 that connect the pair of sub-side members 55, 56.

[Driving Device Unit]

Figure 4:
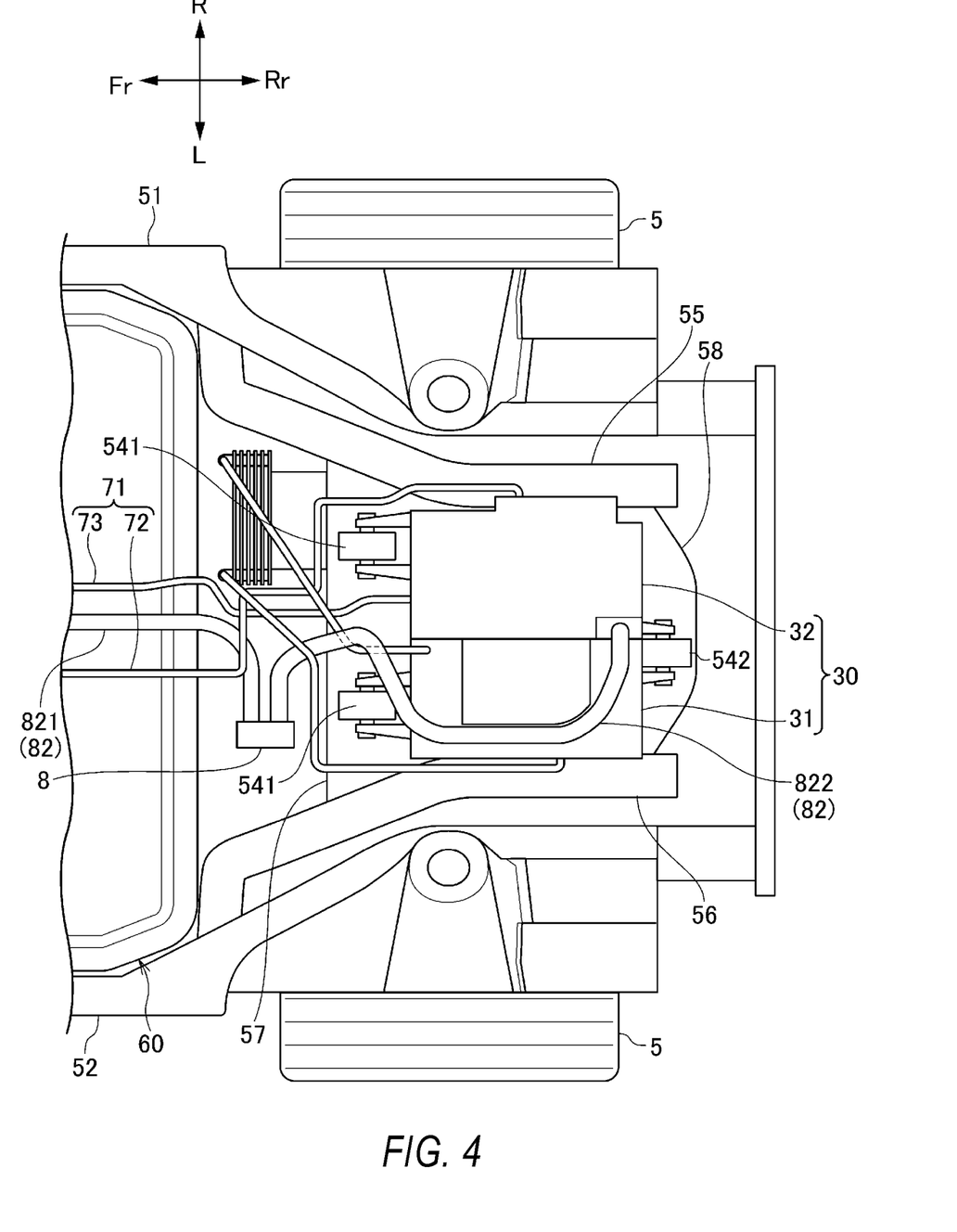
FIG. 4 is a plan view showing a driving device unit of the vehicle in FIG. 1 and a periphery thereof.

The driving device unit 30 includes a driving device 31 that accommodates a motor MOT as an electric motor and a power control unit (PCU) 32 as an electric motor control unit that controls the motor MOT. The driving device 31 and the PCU 32 are electrically connected via a bus bar (not shown).

As shown in FIG. 4, the driving device unit 30 is fixed to a front frame member 57 via a pair of front mounting portions 541, and is fixed to a rear frame member 58 via a pair of rear mounting portions 542. The driving device 31 is provided with the motor MOT and a transmission (not shown), and torque of the motor MOT is transmitted to an output shaft 311 (with reference to FIG. 3) via the transmission, and is transmitted from the output shaft 311 to the rear wheels 5.

[Battery]

Figure 3:
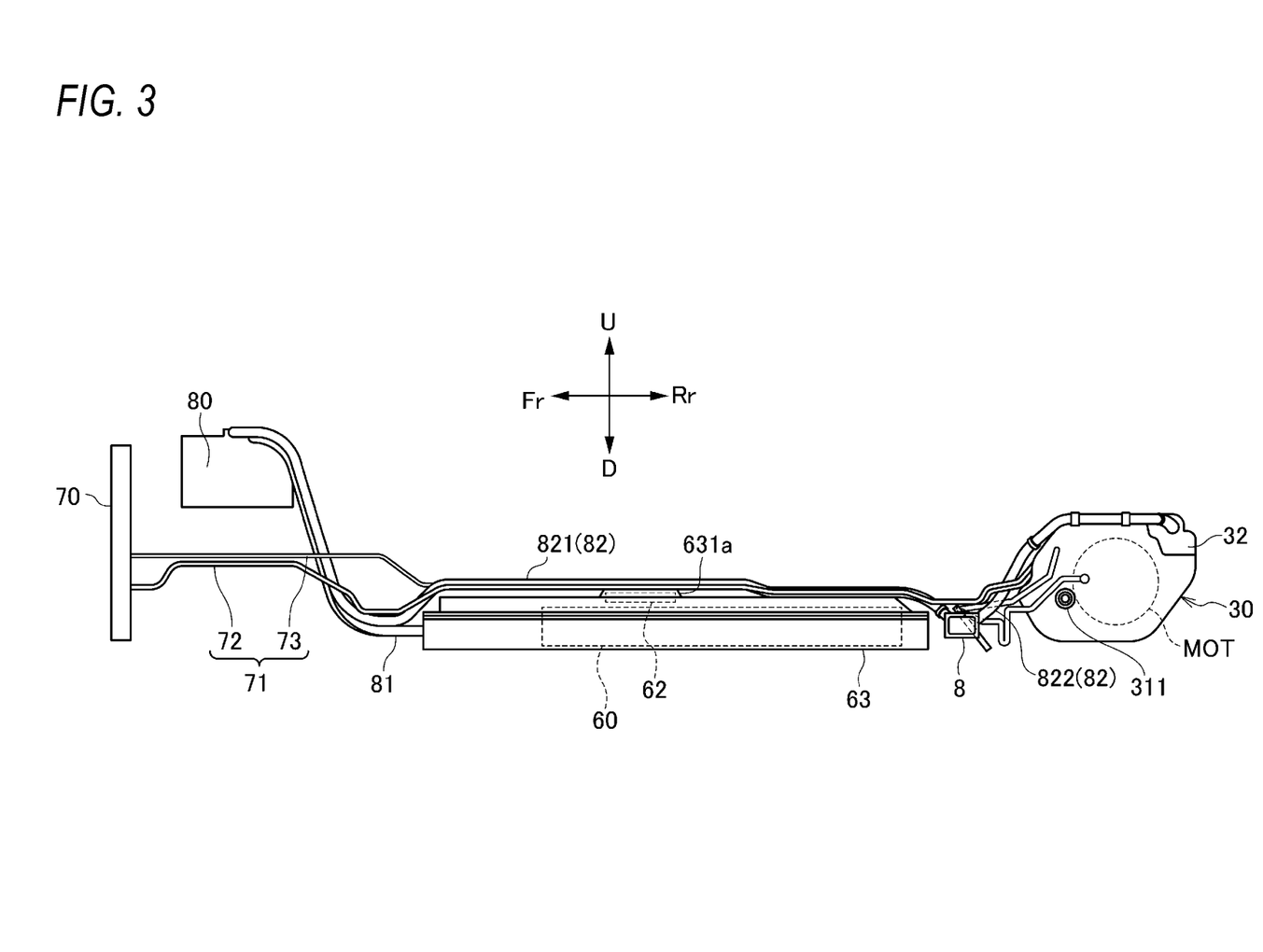
FIG. 3 is a side view showing cooling pipes and cables of the vehicle in FIG. 1.

As shown in FIGS. 1 to 3, a battery 60 is disposed below the vehicle interior 10. The battery 60 is disposed below the floor panel 2, and includes a plurality of battery modules 61, a battery ECU 62 disposed on the battery modules 61, and a battery case 63 that accommodates the battery modules 61 and the battery ECU 62.

The battery case 63 includes a cover plate 631 that covers the battery modules 61 and the battery ECU 62. The cover plate 631 has a cover protruding portion 631a that bulges upward at a position corresponding to the battery ECU 62. That is, in the cover plate 631, only the accommodation area of the battery ECU 62 is bulged upward, so that the height of the other area of the cover plate 631 is kept low.

[Cooling Device]

The front room 20 is provided with a cooling device 70 for cooling the PCU 32. The cooling device 70 includes a radiator provided at a forefront of the vehicle 1. As shown in FIGS. 2 and 3, the cooling device 70 and the PCU 32 are connected by cooling pipes 71. The cooling pipes 71 are arranged between the floor panel 2 and the battery 60 (battery case 63). The cooling pipes 71 includes a first cooling pipe 72 for supplying a refrigerant from the cooling device 70 to the PCU 32, and a second cooling pipe 73 for discharging the refrigerant from the PCU 32 to the cooling device 70. In this way, the cooling pipes 71 (72, 73) connecting the cooling device 70 and the PCU 32 are arranged between the floor panel 2 and the battery 60, so that the long pipes extending in the front-rear direction of the vehicle 1 is protected over a wide area.

[Junction Box and Cable Arrangement]

As shown in FIGS. 1 to 3, the front room 20 is provided with a junction box 80 connected to a charging port (not shown) that is provided at an upper portion of a front end of the vehicle 1. The junction box 80 is connected to the battery 60 via a battery cable 81, and is connected to the PCU 32 via a PCU cable 82. The PCU cable 82 includes a first cable 821 extending from the junction box 80 and a second cable 822 extending from the PCU 32. The first cable 821 and the second cable 822 are connected to each other via a joint box 8 fixed to a lower surface of the cross member 53 located between the battery 60 and the driving device unit 30.

[Structure Under Floor Panel]

Figure 5:
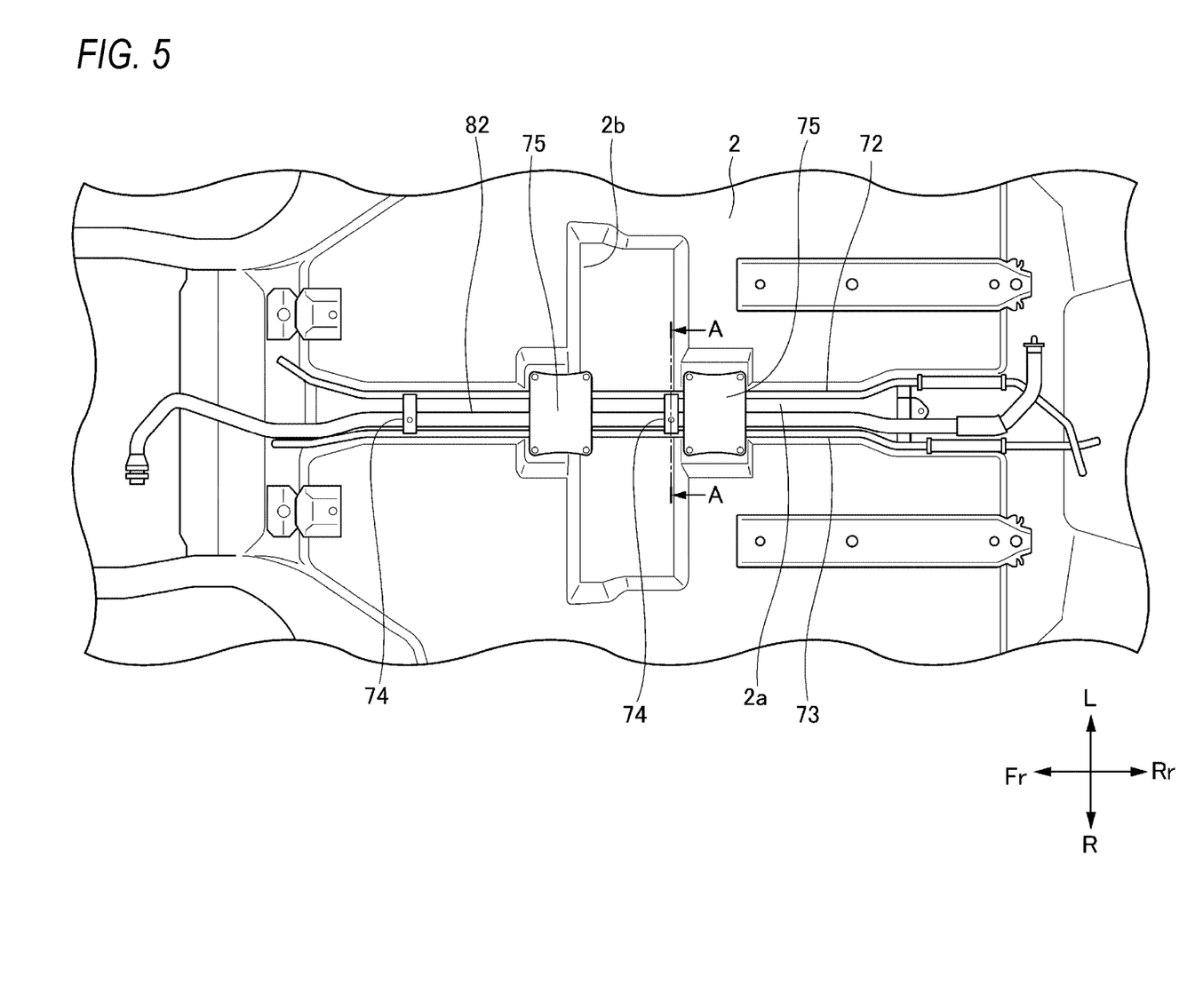
FIG. 5 is a bottom view showing a bottom surface of a floor panel, the cooling pipes, and the cables of the vehicle in FIG. 1.
Figure 6:
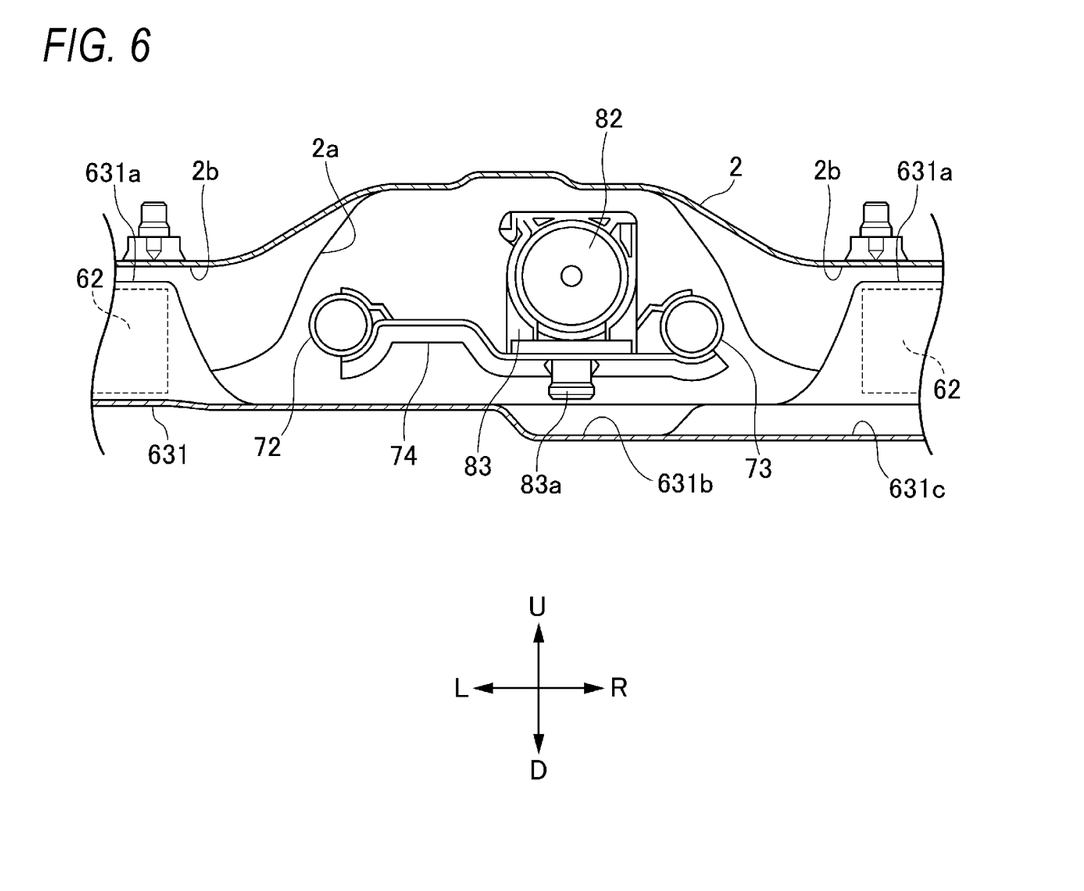
FIG. 6 is a sectional view taken along a line A-A of FIG. 5.

As shown in FIGS. 5 and 6, the floor panel 2 has a recessed portion 2a recessed upwards. The recessed portion 2a is formed in the left-right center part of the floor panel 2 along the front-rear direction, and the first cooling pipe 72 and the second cooling pipe 73 are accommodated in the recessed portion 2a. In arranging a part of the first cooling pipe 72 and the second cooling pipe 73 connecting the cooling device 70 provided in the front room 20 and the PCU 32 provided in the rear of the vehicle interior 10 between the floor panel 2 and the battery 60, the part of the first cooling pipe 72 and the second cooling pipe 73 is accommodated in the recessed portion 2a of the floor panel 2, so that the distance between the battery 60 and the floor panel 2 is reduced and an appropriate distance between the ground and the battery 60 can be ensured.

Further, a part of the PCU cable 82 for connecting the junction box 80 provided in the front room 20 and the PCU 32 is also accommodated in the recessed portion 2a of the floor panel 2. By accommodating the PCU cable 82 in the recessed portion 2a of the floor panel 2, the PCU cable 82 can be disposed in a space surrounded by the floor panel 2 and the battery 60, so that the PCU cable 82 can be protected from impact or the like.

As shown in FIG. 6, the PCU cable 82 is accommodated in the recessed portion 2a of the floor panel 2 so as to overlap the first cooling pipe 72 and the second cooling pipe 73 in the height direction. According to such a configuration, in accommodating the PCU cable 82, the first cooling pipe 72, and the second cooling pipe 73 in the recessed portion 2a of the floor panel 2, the height dimension of the recessed portion 2a can be reduced and the influence on the vehicle interior 10 can be reduced.

The PCU cable 82 is arranged between the first cooling pipe 72 and the second cooling pipe 73. As described above, heat generation of the PCU cable 82 can be reduced by the refrigerant passing through the first cooling pipe 72 and the second cooling pipe 73. Further, the PCU cable 82 is arranged between the first cooling pipe 72 and the second cooling pipe 73 in the vehicle width direction of the vehicle 1, so that PCU cable 82 is near to the center in the vehicle width direction, and electrical safety can be improved.

Figure 7:
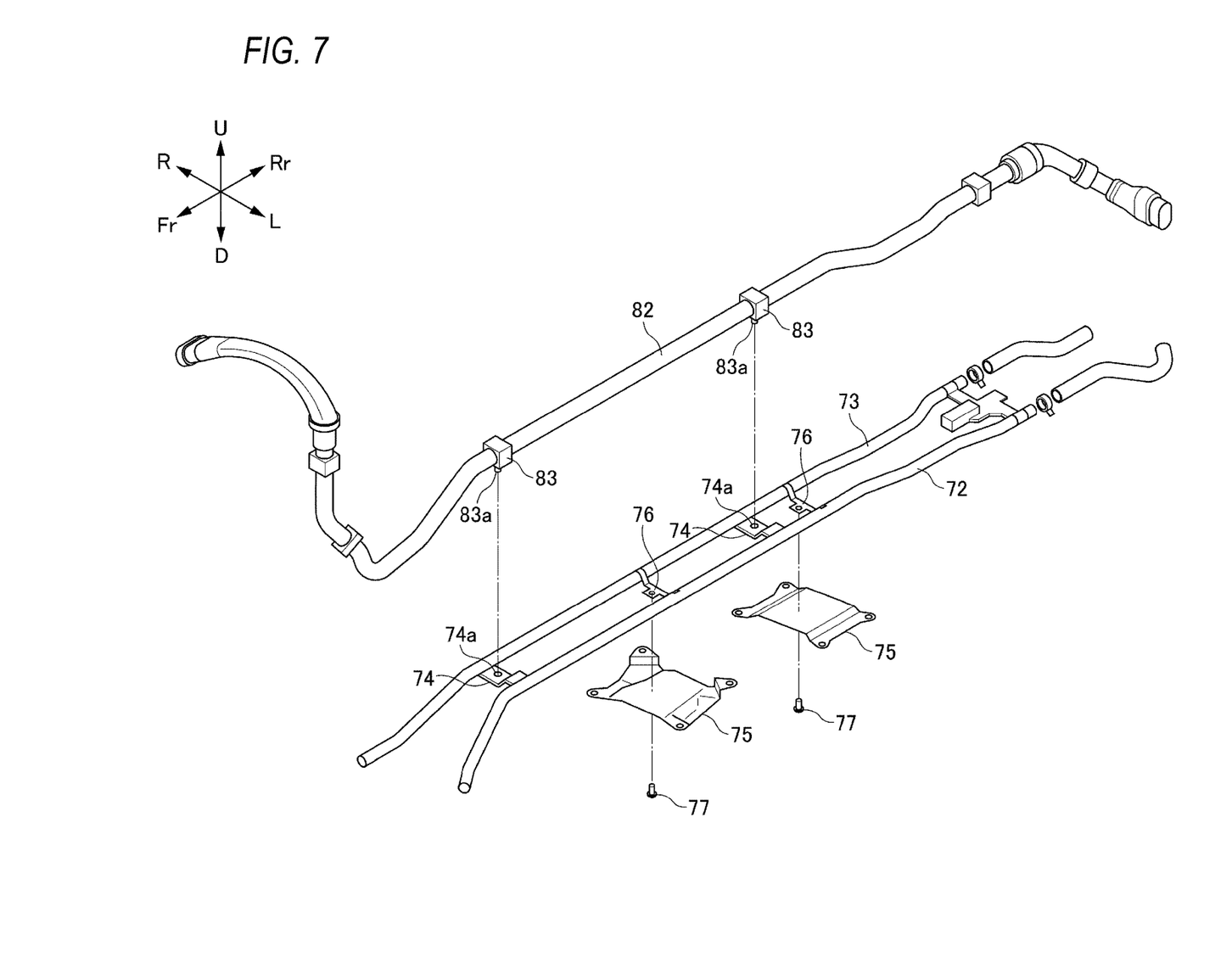
FIG. 7 is an exploded perspective view showing assembly of the cooling pipes and the cables of the vehicle in FIG. 1.

As shown in FIGS. 5 to 7, the PCU cable 82 is directly or indirectly fixed to at least one of the first cooling pipe 72 and the second cooling pipe 73. In the present embodiment, the first cooling pipe 72 and the second cooling pipe 73 are connected via a plurality of bridge members 74, and the PCU cable 82 is fixed to the bridge members 74. More specifically, the PCU cable 82 has a fixed clip 83 protruding downward, and a bulging portion 83a of the fixed clip 83 is fitted into a hole 74a of the bridge member 74, so that the PCU cable 82 is fixed to the bridge member 74.

That is, the PCU cable 82 of the present embodiment is indirectly fixed to the first cooling pipe 72 and the second cooling pipe 73, but the present invention is not limited thereto, and the PCU cable 82 may be directly fixed to at least one of the first cooling pipe 72 and the second cooling pipe 73. According to such a configuration, the PCU cable 82, the first cooling pipe 72, and the second cooling pipe 73 can be temporarily assembled and handled as a sub-assembly, so that the assembling work can be facilitated as compared with the case where they are assembled separately.

The PCU cable 82, the first cooling pipe 72, and the second cooling pipe 73 which are temporarily assembled are fixed to the floor panel 2 via a plurality of brackets 75. The bracket 75 is a plate-shaped member that closes the recessed portion 2a of the floor panel 2 from below. According to such a configuration, even if the rigidity of the floor panel 2 is lowered due to the recessed portion 2a formed on the floor panel 2, the rigidity of the floor panel 2 can be increased by fixing the recessed portion 2a from below using the bracket 75 as the plate-shaped member. In FIG. 7, reference numeral 76 denotes another bridge member that connects the first cooling pipe 72 and the second cooling pipe 73. The bracket 75 is fastened to the other bridge member 76 with a bolt 77, so that the PCU cable 82, the first cooling pipe 72, the second cooling pipe 73, and the bracket 75 can be temporarily assembled and handled as a sub-assembly.

The bulging portion 83a of the fixed clip 83 bulges downward than the PCU cable 82, the first cooling pipe 72 and the second cooling pipe 73. Therefore, there is a risk that the bulging portion 83a may interfere with the cover plate 631 of the battery 60 when the sub-assembly is fixed to the floor panel 2.

Therefore, as shown in FIG. 6, a cover recessed portion 631b recessed downward is provided on the cover plate 631 of the battery 60 at a position corresponding to the bulging portion 83a of the fixed clip 83, so that the interference between the bulging portion 83a of the fixed clip 83 and the cover plate 631 is prevented. Further, the cover plate 631 is provided with a drainage channel 631c connected to a part of the cover recessed portion 631b. According to such a configuration, not only the interference between the bulging portion 83a of the fixed clip 83 and the cover plate 631 can be prevented, but also the accumulation of moisture in the cover recessed portion 631b of the cover plate 631 can be avoided.

As shown in FIG. 2, the cover plate 631 of the battery 60 has the cover protruding portion 631a that bulges upward at a position corresponding to the battery ECU 62 as described above, but the battery ECU 62 and the cover protruding portion 631a are arranged at positions that do not overlap the recessed portion 2a of the floor panel 2 in the plan view. Therefore, it is possible to prevent the cover protruding portion 631a (battery ECU 62) from interfering with the PCU cable 82, the first cooling pipe 72, and the second cooling pipe 73.

As shown in FIGS. 5 and 6, the floor panel 2 has a second recessed portion 2b recessed upwards in a position corresponding to the cover protruding portion 631a. Therefore, the distance between the battery 60 and the floor panel 2 can be reduced, and the distance between the ground and the battery 60 can be ensured.

Second Embodiment

Figure 8:
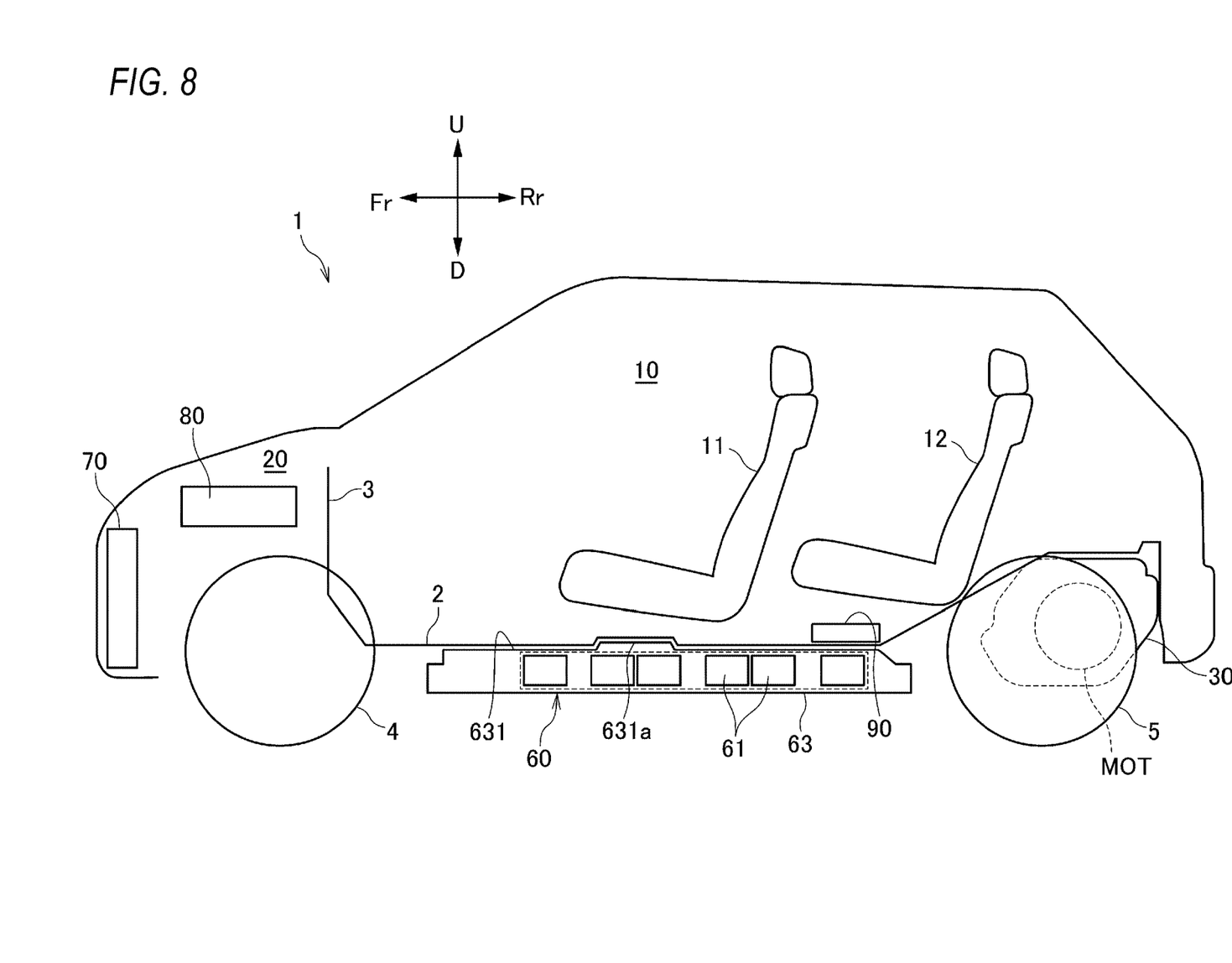
FIG. 8 is a schematic side view showing an overall structure of a vehicle according to a second embodiment of the present invention.
Figure 9:
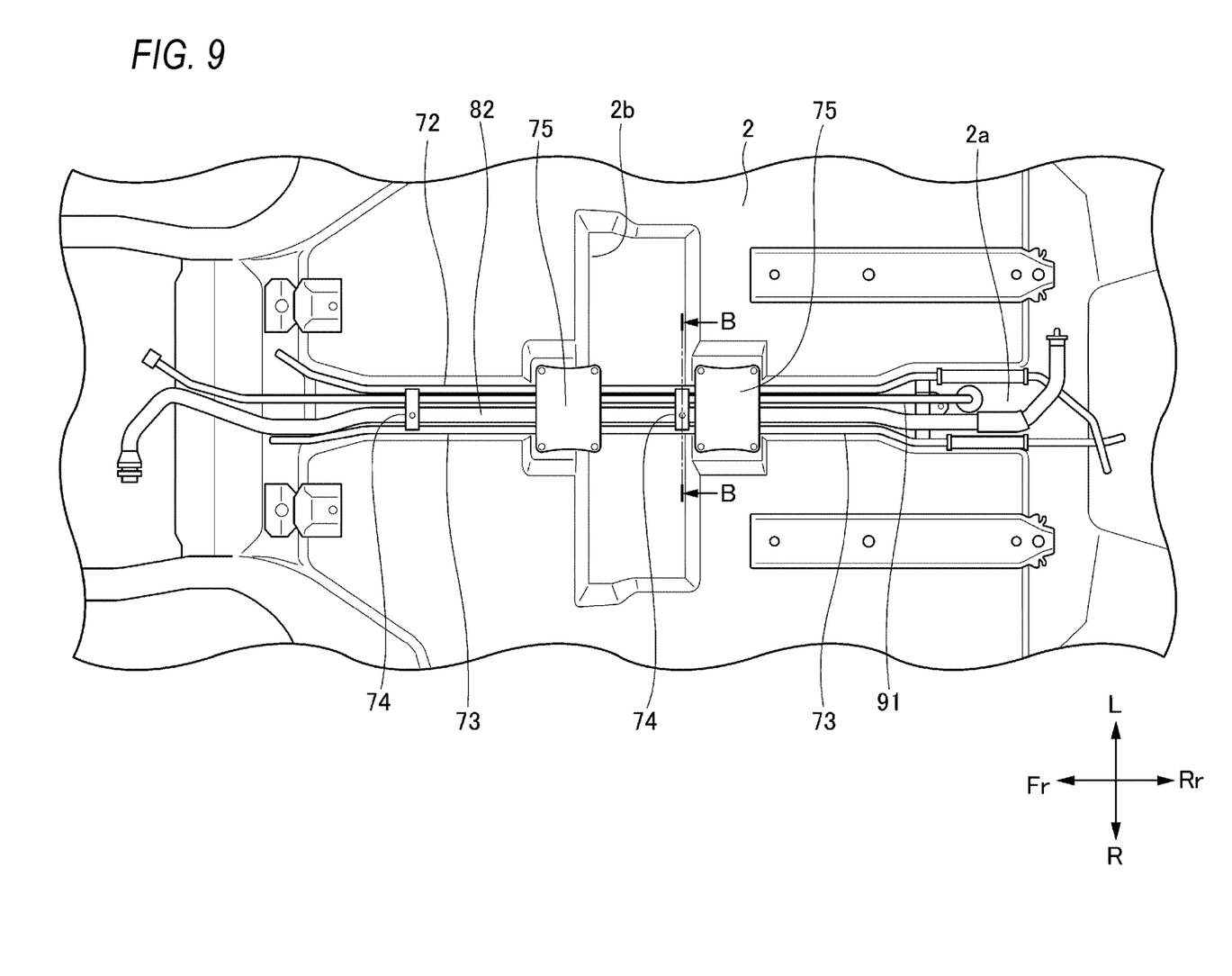
FIG. 9 is a bottom view showing a bottom surface of a floor panel, cooling pipes, and cables of the vehicle in FIG. 8.
Figure 10:
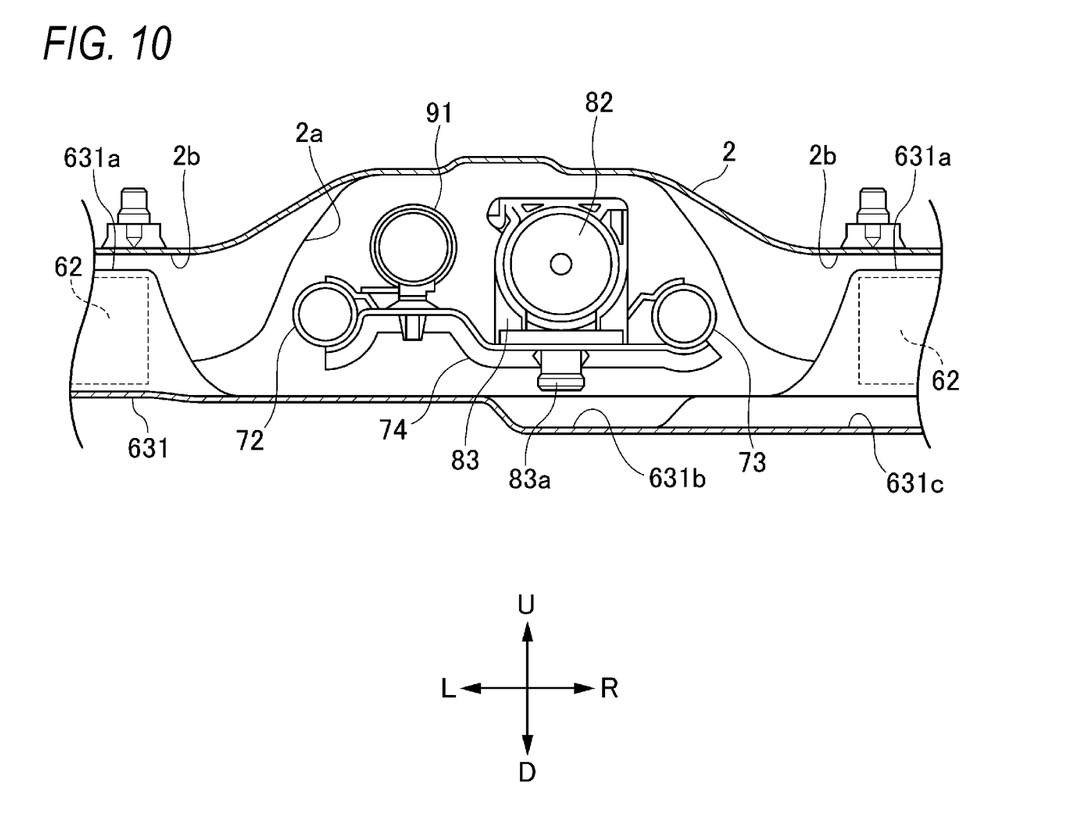
FIG. 10 is a cross-sectional view taken along a line B-B in FIG. 9.

Next, a second embodiment will be described with reference to FIGS. 8 to 10. Note that the description of the first embodiment is incorporated by denoting the same configurations as those of the first embodiment with the same reference numerals as in the first embodiment.

The vehicle 1 of the second embodiment further includes an inverter 90 provided in the rear of the vehicle interior 10 and above the floor panel 2. The inverter 90 is a power conversion device for supplying AC100V power to an AC100V outlet (not shown) provided in the vehicle interior 10, and is connected to the battery 60 via an inverter cable 91. The inverter cable 91 extending from the inverter 90 passes through the floor panel 2 and is disposed in the recessed portion 2a. More specifically, the inverter cable 91 is fixed to a plurality of bridge members 74 that connect the first cooling pipe 72 and the second cooling pipe 73 so as to be parallel to the PCU cable 82, and is accommodated in the recessed portion 2a of the floor panel 2 together with the PCU cable 82, the first cooling pipe 72, and the second cooling pipe 73 as a sub-assembly. According to such a configuration, not only the PCU cable 82, the inverter cable 91, the first cooling pipe 72 and the second cooling pipe 73 can be arranged together, but also the assembly work can be facilitated by handling as a sub-assembly.

Although the embodiments of the present invention have been described above, the present invention is not limited to the above-described embodiments, and modifications, improvements, or the like can be made as appropriate.

At least the following matters are described in the present specification. Although the corresponding constituent elements or the like in the above-described embodiments are shown in parentheses, the present invention is not limited thereto.

(1) A vehicle (vehicle 1) including: a vehicle interior (vehicle interior 10);
a front room (front room 20) provided in front of the vehicle interior;
an electric motor control device (PCU 32) provided at a rear side of the vehicle interior and below a floor panel (floor panel 2);
a battery (battery 60) provided below the vehicle interior and below the floor panel;
a cooling device (cooling device 70) provided in the front room;
a first cooling pipe (first cooling pipe 72) configured to supply a refrigerant from the cooling device to the electric motor control device; and
a second cooling pipe (second cooling pipe 73) configured to discharge the refrigerant from the electric motor control device to the cooling device,
in which the floor panel has a recessed portion (recessed portion 2a) recessed upwards, and
in which the first cooling pipe and the second cooling pipe are accommodated in the recessed portion.

According to the (1), the first cooling pipe and the second cooling pipe that connect the cooling device provided in the front room and the electric motor control device provided in a rear side of the vehicle interior are accommodated the a recessed portion of the floor panel, so that the distance between the battery and the floor panel can be reduced, and the distance between the ground and the battery can be ensured.

(2) The vehicle according to (1) further includes:
a high-voltage cable (PCU cable 82) connecting an apparatus (junction box 80) provided in the front room and the electric motor control device,
in which the high-voltage cable is accommodated in the recessed portion.

According to (2), the high-voltage cable is accommodated in the recessed portion of the floor panel, so that the high-voltage cable can be disposed in a space surrounded by the floor panel and the battery, and the high-voltage cable can be protected from impact or the like.

(3) In the vehicle according to (2),
the high-voltage cable overlaps the first cooling pipe and the second cooling pipe in a height direction.

According to (3), the high-voltage cable is disposed so as to overlap with the first cooling pipe and the second cooling pipe in the height direction, so that the high-voltage cable can be disposed in a space surrounded by the floor panel and the battery, and the high-voltage cable can be protected from impact or the like.

(4) In the vehicle according to (3),
the high-voltage cable is disposed between the first cooling pipe and the second cooling pipe.

According to (4), the high-voltage cable is disposed between the first cooling pipe and the second cooling pipe, so that the high-voltage cable can be cooled by the refrigerant passing through the first cooling pipe and the second cooling pipe.

(5) In the vehicle according to any one of (2) to (4),
the high-voltage cable is directly or indirectly fixed to at least one of the first cooling pipe and the second cooling pipe, and
the first cooling pipe and the second cooling pipe are fixed to the floor panel via a bracket (bracket 75).

According to (5), the high-voltage cable is directly or indirectly fixed to at least one of the first cooling pipe and the second cooling pipe, so that the high-voltage cable, the first cooling pipe and the second cooling pipe can be temporarily assembled, and the assembling work can be facilitated.

(6) In the vehicle according to (5),
the high-voltage cable is directly or indirectly fixed to at least one of the first cooling pipe and the second cooling pipe via a fixed component (fixed clip 83),
the fixed component includes a bulging portion (bulging portion 83a) that bulges downward than the high-voltage cable, the first cooling pipe, and the second cooling pipe, and
a cover plate (cover plate 631) of the battery includes a cover recessed portion (cover recessed portion 631b) provided at a position corresponding to the bulging portion, and a drainage channel (drainage channel 631c) connected to the cover recessed portion.

According to (6), the cover plate of the battery is provided is provided with the cover recessed portion positioned correspondingly to the bulging portion of the fixed component, so that the interference between the fixed component and the cover plate can be prevented. Further, the drainage channel is connected to the cover recessed portion, so that the accumulation of moisture in the recessed portion of the cover plate can be prevented.

(7) In the vehicle according to (5) or (6),
the bracket is a plate-shaped member that closes the recessed portion from below.

According to (7), the rigidity of the floor panel is lowered due to the recessed portion formed on the floor panel, but the rigidity of the floor panel can be increased by fixing the recessed portion from below using the bracket as the plate-shaped member.

(8) In the vehicle according to any one of (1) to (7),
the battery includes a battery module (battery module 61), and an electrical apparatus (battery ECU 62) disposed at an upper portion of the battery module, and
the electrical apparatus is disposed at a position that does not overlap the recessed portion in a plan view.

According to (8), the electrical apparatus that protrudes upward from the battery module is disposed at a position that does not overlap the recessed portion of the floor panel, so that interference between the electrical apparatus and the first cooling pipe and the second cooling pipe can be prevented.

(9) In the vehicle according to (8),
the cover plate of the battery has a cover protruding portion (cover protruding portion 631a) at a position corresponding to the electrical apparatus, and
the floor panel has a second recessed portion (second recessed portion 2b) recessed upward at a position corresponding to the cover protruding portion.

According to (9), the floor panel has the second recessed portion recessed upward at the position corresponding to the cover protruding portion that covers the electrical apparatus, so that the distance between the battery and the floor panel can be reduced, and the distance between the ground and the battery can be ensured.

(10) The vehicle according to any one of (1) to (9), further including:
an inverter (inverter 90) provided in the rear side of the vehicle interior and above the floor panel,
wherein a power cable (inverter cable 91) extending from the inverter passes through the floor panel and is disposed in the recessed portion.

According to (10), the power cable extending from the inverter can also be disposed in the recessed portion, so that the power cable, the first cooling pipe, and the second cooling pipe can be collectively arranged.

The invention claimed is:
1. A vehicle comprising:
a vehicle interior;
a front room provided in front of the vehicle interior;
an electric motor control device provided at a rear side of the vehicle interior and below a floor panel;
a battery provided below the vehicle interior and below the floor panel;
a cooling device provided in the front room;
a first cooling pipe configured to supply a refrigerant from the cooling device to the electric motor control device; and
a second cooling pipe configured to discharge the refrigerant from the electric motor control device to the cooling device,
wherein the floor panel has a recessed portion recessed upwards, and
wherein the first cooling pipe and the second cooling pipe are accommodated in the recessed portion.
2. The vehicle according to claim 1, further comprising:
a high-voltage cable connecting an apparatus provided in the front room and the electric motor control device,
wherein the high-voltage cable is accommodated in the recessed portion.
3. The vehicle according to claim 2,
wherein the high-voltage cable overlaps the first cooling pipe and the second cooling pipe in a height direction.
4. The vehicle according to claim 3,
wherein the high-voltage cable is disposed between the first cooling pipe and the second cooling pipe.
5. The vehicle according to claim 2,
wherein the high-voltage cable is directly or indirectly fixed to at least one of the first cooling pipe and the second cooling pipe, and
wherein the first cooling pipe and the second cooling pipe are fixed to the floor panel via a bracket.
6. The vehicle according to claim 5,
wherein the high-voltage cable is directly or indirectly fixed to at least one of the first cooling pipe and the second cooling pipe via a fixed component,
wherein the fixed component includes a bulging portion that bulges downward than the high-voltage cable, the first cooling pipe, and the second cooling pipe, and
wherein a cover plate of the battery includes a cover recessed portion provided at a position corresponding to the bulging portion, and a drainage channel connected to the cover recessed portion.
7. The vehicle according to claim 5,
wherein the bracket is a plate-shaped member that closes the recessed portion from below.

8. The vehicle according to claim 1,
wherein the battery includes a battery module, and an electrical apparatus disposed at an upper portion of the battery module, and
wherein the electrical apparatus is disposed at a position that does not overlap the recessed portion in a plan view.

9. The vehicle according to claim 8,
wherein the cover plate of the battery has a cover protruding portion at a position corresponding to the electrical apparatus, and
wherein the floor panel has a second recessed portion recessed upward at a position corresponding to the cover protruding portion.

10. The vehicle according to claim 1, further comprising:
an inverter provided in the rear side of the vehicle interior and above the floor panel,
wherein a power cable extending from the inverter passes through the floor panel and is disposed in the recessed portion.

* * * * *